US009257100B2

(12) United States Patent
Han et al.

(10) Patent No.: US 9,257,100 B2
(45) Date of Patent: Feb. 9, 2016

(54) DISPLAY DEVICE AND DRIVING METHOD THEREOF

(75) Inventors: Sang Su Han, Yongin-si (KR); Min Joo Lee, Seoul (KR); Po-Yun Park, Asan-si (KR); Youn Jin Jung, Daejeon (KR); Jung Hwan Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 515 days.

(21) Appl. No.: 13/545,125

(22) Filed: Jul. 10, 2012

(65) Prior Publication Data

US 2013/0076760 A1 Mar. 28, 2013

(30) Foreign Application Priority Data

Sep. 26, 2011 (KR) ........................ 10-2011-0096962

(51) Int. Cl.

| | |
|---|---|
| ***G06F 15/00*** | (2006.01) |
| ***G09G 5/377*** | (2006.01) |
| ***G09G 5/395*** | (2006.01) |
| *G09G 3/36* | (2006.01) |
| *G09G 5/393* | (2006.01) |

(52) U.S. Cl.
CPC ................ *G09G 5/377* (2013.01); *G09G 5/395* (2013.01); *G09G 3/3611* (2013.01); *G09G 5/393* (2013.01); *G09G 2340/02* (2013.01); *G09G 2360/18* (2013.01)

(58) Field of Classification Search
CPC ............................... G09G 5/395; G09G 5/377
USPC ........................................... 345/501; 348/564
See application file for complete search history.

(56) References Cited

U.S. PATENT DOCUMENTS

| | | | | |
|---|---|---|---|---|
| 5,257,113 | A * | 10/1993 | Chen et al. | 382/235 |
| 6,362,850 | B1 * | 3/2002 | Alsing et al. | 348/239 |
| 6,636,220 | B1 * | 10/2003 | Szeliski et al. | 345/475 |
| 7,684,492 | B2 | 3/2010 | Seo | |
| 7,876,313 | B2 | 1/2011 | Selwan et al. | |
| 2003/0112340 | A1 | 6/2003 | Okada et al. | |
| 2003/0169247 | A1 * | 9/2003 | Kawabe et al. | 345/204 |
| 2006/0164365 | A1 * | 7/2006 | Huang et al. | 345/98 |
| 2006/0170822 | A1 | 8/2006 | Baba et al. | |
| 2007/0053013 | A1 * | 3/2007 | Takahashi | 358/474 |
| 2007/0285371 | A1 * | 12/2007 | Nam et al. | 345/98 |
| 2008/0079739 | A1 | 4/2008 | Gupta et al. | |
| 2008/0174681 | A1 * | 7/2008 | Okada et al. | 348/231.99 |
| 2008/0259059 | A1 * | 10/2008 | De Greef | 345/204 |

(Continued)

FOREIGN PATENT DOCUMENTS

| | | |
|---|---|---|
| CN | 1413414 | 4/2003 |
| CN | 1801268 | 7/2006 |

(Continued)

*Primary Examiner* — Phi Hoang
*Assistant Examiner* — Jitesh Patel
(74) *Attorney, Agent, or Firm* — Cantor Colburn LLP

(57) ABSTRACT

A display device includes: a display panel displaying a still image and a motion picture; a display panel which displays a still image and a motion picture; a signal controller which controls signals to drive the display panel; and a graphics processing unit which transmits input image data to the signal controller, where the signal controller includes a frame memory which stores compressed image data generated by compressing the input image data, and a mixer which mixes compression recovered image data generated by recovering the compressed image data and the input image data to generate mixed image data.

27 Claims, 13 Drawing Sheets

(56) References Cited

U.S. PATENT DOCUMENTS

| | | | | |
|---|---|---|---|---|
| 2008/0316197 | A1 | 12/2008 | Ds | |
| 2009/0009461 | A1* | 1/2009 | Chia et al. | 345/99 |
| 2009/0021499 | A1* | 1/2009 | Chen et al. | 345/204 |
| 2009/0196514 | A1* | 8/2009 | Rodriguez et al. | 382/232 |
| 2009/0207183 | A1* | 8/2009 | Matsuura | 345/606 |
| 2009/0231314 | A1* | 9/2009 | Hanaoka et al. | 345/208 |
| 2010/0074322 | A1* | 3/2010 | Terashima | 375/240.01 |
| 2010/0177128 | A1* | 7/2010 | Someya et al. | 345/690 |
| 2010/0220236 | A1* | 9/2010 | Suzuki | 348/627 |
| 2011/0023064 | A1* | 1/2011 | Tsai et al. | 725/48 |
| 2011/0091122 | A1 | 4/2011 | Park et al. | |
| 2012/0120083 | A1* | 5/2012 | Kong et al. | 345/545 |

FOREIGN PATENT DOCUMENTS

| | | |
|---|---|---|
| CN | 102067586 | 5/2011 |
| JP | 09116902 | 5/1997 |
| JP | 3594589 | 9/2004 |
| JP | 2007025073 | 2/2007 |
| JP | 4214562 | 11/2008 |
| JP | 2009093548 | 4/2009 |
| JP | 2010258767 | 11/2010 |
| KR | 1019980025576 | 7/1998 |
| KR | 1020050062116 | 6/2005 |
| KR | 1020060106408 | 10/2006 |
| KR | 100945116 | 2/2010 |

* cited by examiner

DISPLAY DEVICE AND DRIVING METHOD THEREOF

This application claims priority to Korean Patent Application No. 10-2011-0096962, filed on Sep. 26, 2011, and all the benefits accruing therefrom under U.S.C. §119, the content of which in its entirety is herein incorporated by reference.

BACKGROUND OF THE INVENTION (a) Field of the Invention

Exemplary embodiments of the invention relate to a display device and a driving method thereof. More particularly, exemplary embodiments of the invention relate to a display device and a driving method thereof with reduced size of a non-display area at a lower cost.

(b) Description of the Related Art

A display device is widely used for a computer monitor, a television and a mobile phone, for example. The display device includes a cathode ray tube display device, a liquid crystal display and a plasma display device, for example.

The display device typically includes a graphics processing unit ("GPU"), a display panel and a signal controller. The GPU transmits image data to be displayed to the display panel to the signal controller, and the signal controller generates and transmits a control signal and transmits along with the image data to the display panel to drive the display panel and to thereby drive the display device.

The image displayed on the display panel may be classified into a still image and a motion picture. The display panel typically displays several frames per second. In the display device, when the image data included in each frame are the same, the still image is displayed. Further, when the image data included in each frame are different, the motion picture is displayed.

In the display device, even when the motion picture and the still image are displayed on the display panel, the signal controller receives the same image data from the graphics processing unit every frame, such that the power consumption increases.

Recently, researches on reducing the power consumption of the display device have been attempted. As one of the researches on reducing the power consumption of the display device, a method in which image data of an image is stored in a frame memory by including the frame memory to the signal controller, and the stored image data is provided to the display panel while displaying the still image has been proposed. This is called a panel self-refresh ("PSR") mode, and since the image data is not transmitted from the graphics processing unit while displaying the still image, the graphics processing unit is inactivated such that power consumption may be reduced.

However, in such a method where the signal controller is driven in the PSR mode, the manufacturing cost is increased due to the addition of the frame memory as a constituent element and the size of the non-display area, where an image is not displayed, is increased.

BRIEF SUMMARY OF THE INVENTION

Exemplary embodiments of the invention relate to a display device with reduced manufacturing cost and reduced size of a non-display area, and a driving method of the display device.

An exemplary embodiment of a display device according to the invention includes: a display panel which displays a still image and a motion picture; a signal controller which controls signals to drive the display panel; and a graphics processing unit which transmits input image data to the signal controller, where the signal controller includes a frame memory which stores compressed image data generated by compressing the input image data, and a mixer which mixes compression recovered image data generated by recovering the compressed image data and the input image data to generate mixed image data.

In an exemplary embodiment, the compression recovered image data may include a simple compression recovered image data generated by recovering the compressed image data before the compress image data is stored in the frame memory, and a stored compression recovered image data generated by recovering the compressed image data stored in the frame memory.

In an exemplary embodiment, the signal controller may output the input image data to the display panel in a motion picture display period in which the motion picture is displayed, the signal controller output the stored compression recovered image data to the display panel in a still image display period in which the still image is displayed, and the signal controller output the mixed image data to the display panel in a first image conversion period in which the motion picture is converted into the still image.

In an exemplary embodiment, the mixed image data may have a value between the input image data and the compression recovered image data.

In an exemplary embodiment, the first image conversion period may include a plurality of frames, and the mixed image data may have a value which becomes closer to the input image data as a corresponding frame of the value of the mixed image data becomes closer to the motion picture display period and becomes closer to the compression recovered image data as the corresponding frame of the value of the mixed image data becomes closer to the still image display period.

In an exemplary embodiment, the mixer may mix the simple compression recovered image data and the input image data in the first image conversion period.

In an exemplary embodiment, the mixer may generate the mixed image data using the following equation:

$$D_{ob} = \frac{D_{io} * (n_t - n_f) + D_{ir} * n_f}{n_t},$$

where $D_{ob}$ denotes the value of the mixed image data, $D_{io}$ denotes a value of the input image data, $D_{ir}$ denotes a value of the simple compression recovered image data, $n_t$ denotes a number of the frames included in the first image conversion period, and $n_f$ denotes a frame number of the corresponding frame of the value of the mixed image data in the first image conversion period.

In an exemplary embodiment, the mixer may mix the stored compression recovered image data and the input image data in the first image conversion period.

In an exemplary embodiment, the mixer may generate the mixed image data using the following equation:

$$D_{ob} = \frac{D_{io} * (n_t - n_f) + D_{mr} * n_f}{n_t},$$

where $D_o$ denotes the value of the mixed image data, $D_{io}$ denotes a value of the input image data, $D_{mr}$ denotes a value of the stored compression recovered image data, $n_t$ is a number of the frames included in the first image conversion period, and $n_f$ is a frame number of the corresponding frame of the value of the mixed image data in the first image conversion period.

In an exemplary embodiment, the signal controller may output the mixed image data to the display panel in a second image conversion period in which the still image is converted into the motion picture.

In an exemplary embodiment, the mixer may include: a comparator which compares the simple compression recovered image data and the stored compression recovered image data in a second image conversion period in which the still image is converted into the motion picture; a calculator which generates the mixed image data; and a multiplexer which outputs the mixed image data to the display panel when the simple compression recovered image data and the stored compression recovered image data are substantially the same as each other, and outputs the input image data to the display panel when the simple compression recovered image data and the stored compression recovered image data are different from each other.

In an exemplary embodiment, the calculator may generate the mixed image data using the following equation:

$$D_{ob} = \frac{D_{io} * n_f + D_{ir} * (n_t - n_f)}{n_t},$$

where $D_{ob}$ denotes the value of the mixed image data, $D_{io}$ denotes a value of the input image data, $D_{ir}$ denotes a value of the simple compression recovered image data, $n_t$ is a number of the frames included in the first image conversion period, and $n_f$ is a frame number of the corresponding frame of the value of the mixed image data.

In an exemplary embodiment, the signal controller may include: a signal receiver which receives the input image data from the graphics processing unit; an encoder which receives the input image data from the signal receiver and compresses the input image data such that the compressed image data is generated; a first decoder which receives the compressed image data from the encoder and recovers the compressed image data; and a second decoder which recovers the compressed image data stored in the frame memory.

In an exemplary embodiment, the display device may further include a first delay unit which delays and transmits the simple compression recovered image data to the mixer, and a second delay unit which delays and transmits the stored compression recovered image data to the mixer.

An exemplary embodiment of a driving method of a display device according to the invention includes: transmitting input image data from a graphics processing unit of the display device to a signal controller of the display device; receiving a still image start signal and compressing the input image data into compressed image data; storing the compressed image data in a frame memory of the display device; and generating mixed image data by mixing compression recovered image data and the input image data, and outputting the mixed image data to a display panel of the display device, where the compression recovered image data is generated by recovering the compressed image data in a first image conversion period, in which a motion picture is converted into a still image.

In an exemplary embodiment, the mixed image data may have a value between the input image data and the compression recovered image data.

In an exemplary embodiment, the first image conversion period may include a plurality of frames, and the mixed image data may have a value which becomes closer to the input image data as a corresponding frame of the value becomes closer to a motion picture display period, in which the motion picture is displayed, and becomes closer to the compression recovered image data as the corresponding frame of the value of the mixed image data becomes closer to a still image display period, in which the still image is displayed.

In an exemplary embodiment, the compression recovered image data may include simple compression recovered image data generated by recovering the compressed image data before the compress image data is stored in the frame memory, and stored compression recovered image data generated by recovering the compressed image data stored in the frame memory.

In an exemplary embodiment, the generating the mixed image data by mixing the compression recovered image data and the input image data may include mixing the simple compression recovered image data and the input image data.

In an exemplary embodiment, the generating the mixed image data by mixing the compression recovered image data and the input image data further comprises using the following equation:

$$D_{ob} = \frac{D_{io} * (n_t - n_f) + D_{ir} * n_f}{n_t},$$

where $D_{ob}$ denotes the value of the mixed image data, $D_{io}$ denotes a value of the input image data, $D_{ir}$ denotes a value of the simple compression recovered image data, $n_t$ denotes a number of the frames included in the first image conversion period, and $n_f$ denotes a frame number of the corresponding frame of the value of the mixed image data in the first image conversion period.

In an exemplary embodiment, the generating the mixed image data by mixing the compression recovered image data and the input image data may include mixing the stored compression recovered image data and the input image data.

In an exemplary embodiment, the generating the mixed image data by mixing the compression recovered image data and the input image data further comprises using the following equation:

$$D_{ob} = \frac{D_{io} * (n_t - n_f) + D_{mr} * n_f}{n_t},$$

where $D_o$ denotes the value of the mixed image data, $D_{io}$ denotes a value of the input image data, $D_{mr}$ denotes a value of the stored compression recovered image data, $n_t$ denotes a number of the frames included in the first image conversion period, and $n_f$ denotes a frame number of the corresponding frame of the value of the mixed image data in the first image conversion period.

In an exemplary embodiment, the method may further include outputting the stored compression recovered image data to the display panel in the still image display period, where the graphics processing unit stops transmission of the input image data in the still image display period.

In an exemplary embodiment, the method may further include receiving a still image ending signal, where the graphics processing unit transmits the input image data to the signal controller when receiving the still image ending signal.

In an exemplary embodiment, the method may further includes mixing the compression recovered image data and the input image data in a second image conversion period in which the still image is converted into the motion picture, and outputting the mixed image data to the display panel.

In an exemplary embodiment, the method may further include outputting the input image data to the display panel in the motion picture display period.

In an exemplary embodiment, the method may further include: comparing the simple compression recovered image data and the stored compression recovered image data in a second image conversion period in which the still image is converted into the motion picture; mixing the compression recovered image data and the input image data; and outputting the mixed image data to the display panel when the simple compression recovered image data and the stored compression recovered image data are substantially the same as each other, and outputting the input image data to the display panel when the simple compression recovered image data and the stored compression recovered image data are different from each other.

In an exemplary embodiment, the mixing the compression recovered image data and the input image data comprises using the following equation:

$$D_{ob} = \frac{D_{io} * n_f + D_{ir} * (n_t - n_f)}{n_t},$$

where $D_{ob}$ denotes the value of the mixed image data, $D_{io}$ denotes a value of the input image data, $D_{ir}$ denotes a value of the simple compression recovered image data, $n_t$ denotes a number of the frames included in the second image conversion period, and $n_f$ denotes a frame number of the corresponding frame of the value of the mixed image data in the second image conversion period.

In an exemplary embodiment, the generating mixed image data by mixing compression recovered image data and the input image data may include delaying the compression recovered image data such that the compression recovered image data is synchronized with the input image data.

In an exemplary embodiment, the display device and the driving method thereof according to the invention compress and store the image data to the frame memory such that the size of the frame memory is substantially reduced, thereby reducing the manufacturing cost and the size of non-display area.

In an exemplary embodiment, the display device and the driving method thereof according to the invention mix and output the input image data and the compression recovered image data in the period in which the motion picture and the still image are converted into each other, and recognition of an error generated during the compression of the image data by a viewer is thereby substantially reduced or effectively prevented.

BRIEF DESCRIPTION OF THE DRAWINGS

The above and other aspects and features will become more apparent by describing in further detail exemplary embodiments thereof with reference to the accompanying drawings, in which.

DETAILED DESCRIPTION OF THE INVENTION

Figure 1:
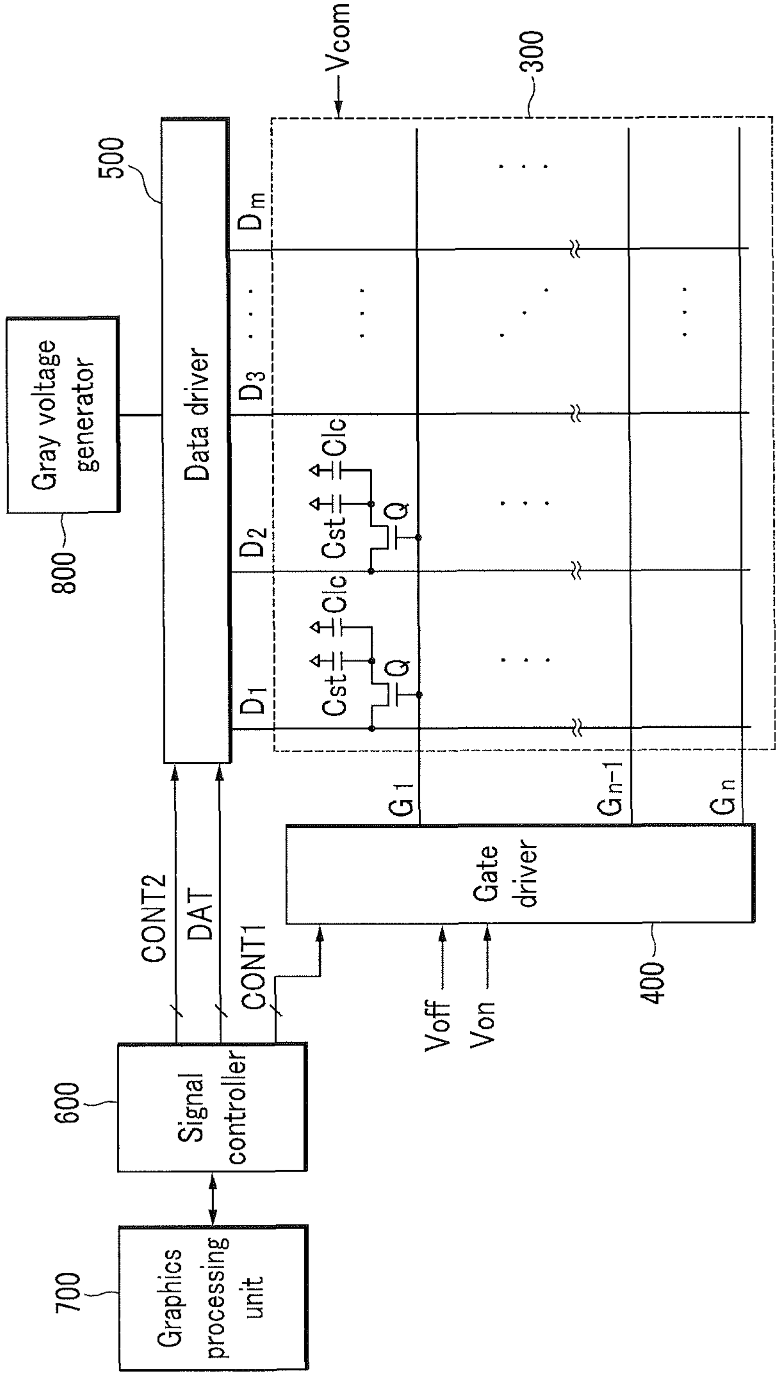
FIG. 1 is a block diagram showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

Firstly, an exemplary embodiment of a display device according to the invention will be described with reference to FIG. 1.

FIG. 1 is a block diagram showing an exemplary embodiment of a display device according to the invention.

As shown in FIG. 1, a display device includes a display panel 300 that displays images, a gate driver 400, a data driver 500, a signal controller 600 that controls signals of the gate driver 400 and the data driver 500 to drive the display panel 300, a graphics processing unit 700 that transmits input image data to the signal controller 600 and a gray voltage generator 800.

The display panel 300 receives image data DAT from the signal controller 600 to display an image, e.g., a still image and a motion picture. In such an embodiment, when a plurality of sequent frames has a same image data DAT, the still image is displayed. In such an embodiment, when the plurality of sequent frames has different image data DAT, the motion picture is displayed The display panel 300 includes a plurality of gate lines G1 to Gn and a plurality of data lines D1 to Dm. In an exemplary embodiment, the gate lines G1 to Gn extend in a transverse direction, and the data lines D1 to Dm extend in a longitudinal direction intersecting the gate lines G1 to Gn.

One of the gate lines G1 to Gn and one of the data lines D1 to Dm are connected to one pixel. In an exemplary embodiment, each pixel includes a switching element Q connected to a corresponding gate line of the gate lines G1 to Gn and to a corresponding data line of the data lines D1 to Dm. The switching element Q of each pixel includes a control terminal connected to the corresponding gate line, an input terminal connected to the corresponding data line, and an output terminal connected to a liquid crystal capacitor $C_{LC}$ and a storage capacitor $C_{ST}$ thereof.

In an exemplary embodiment, as shown in FIG. 1, the display panel 300 may be a liquid crystal panel, but the invention is not limited thereto. In an alternative exemplary embodiment, the display panel 300 may be other types of display panel, for example, an organic light emitting panel, an electrophoretic display panel and a plasma display panel.

The signal controller 600 processes the input image data and the control signal based on an operation condition of the liquid crystal panel 300 in response to the input image data DAT inputted from the graphics processing unit 700 and the control signal, and then generates and outputs a gate control signal CONT1 and a data control signal CONT2. In an exemplary embodiment the control signal may include a vertical synchronization signal, a horizontal synchronizing signal, a main clock signal and a data enable signal, for example.

The gate control signal CONT1 includes a scanning start signal (also referred to as "STV signal") instructing an output start of a gate-on pulse (a high period of a gate signal) and a gate clock signal (also referred to as "CPV signal") instructing an output time of the gate-on pulse.

The data control signal CONT2 further includes a horizontal synchronization start signal that instructs an input start of the image data DAT and a load signal that applies a corresponding data voltage to the data lines D1 to Dm.

The graphics processing unit 700 transmits the input image data to the signal controller 600. When the display panel 300 displays the motion picture, the graphics processing unit 700 transmits the input image data to the signal controller 600 for each frame. When the display panel 300 displays the still image, the signal controller 600 compresses, stores and recovers the input image data transmitted from the graphics processing unit 700 and transmits the recovered input image data to the display panel 300 such that the graphics processing unit 700 does not transmit the input image data to the signal controller 600.

Hereinafter, a signal controller of an exemplary embodiment of a display device according to the invention will be described.

Figure 2:
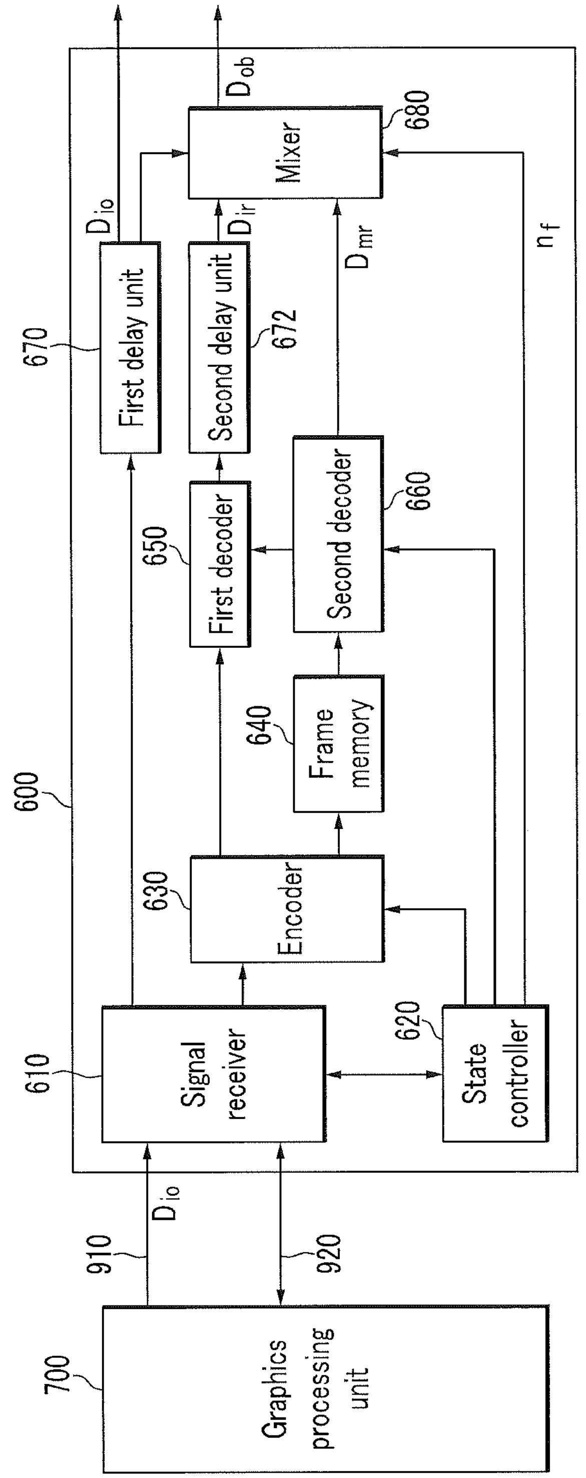
FIG. 2 is a block diagram showing a graphics processing unit and a signal controller of an exemplary embodiment of a display device according to the invention.

FIG. 2 is a block diagram showing a graphics processing unit and a signal controller of an exemplary embodiment of a display device according to the invention.

The signal controller 600 of the display device includes a signal receiver 610 that receives the input image data $D_{io}$ from the graphics processing unit 700, an encoder 630 that receives and compresses the input image data $D_{io}$ from the signal receiver 610, a frame memory 640 that stores the compressed image data, a first decoder 650 that recovers the compressed image data after the encoder 630 compresses the input image data $D_{io}$, a second decoder 660 that recovers the compressed image data stored in the frame memory 640, and a mixer 680 that mixes the input image data $D_{io}$ and compression recovered image data $D_{ir}$ and $D_{mr}$, which are the compressed image data that has been recovered by the first and second decoder 650 and 660, respectively.

The signal receiver 610 is connected to the graphics processing unit 700 by two links. In an exemplary embodiment, as shown in FIG. 2, the two links include a main link 910 and an auxiliary link 920. In an exemplary embodiment, the main link 910 is a one-direction channel, and the auxiliary link 920 is a half duplex bi-direction channel. The signal receiver 610 receives the input image data $D_{io}$ from the graphics processing unit 700 through the main link 910. In an exemplary embodiment, the signal receiver 610 receives a still image start signal for informing of a start of the still image and audio data from the graphics processing unit 700 through the auxiliary link 920, and transmits a signal for informing of a driving state of the display panel to the graphics processing unit 700.

The encoder 630 performs the compression of the input image data $D_{io}$ into compressed image data by converting the state and the type to reduce the size of the input image data $D_{io}$. The compression may be performed through various methods, which may be divided into a loss compression method and a lossless compression method. In the lossless compression method, the compressed original image and the recovered image are substantially identical to each other such that the operation is substantially effectively executed, while the compression ratio is not high. In the loss compression method, the compression is high, while the original image and the recovered image are not substantially identical to each other.

The frame memory 640 is connected to the encoder 630 and stores the compressed image data that is compressed by the encoder 630. The stored compressed image data is used to display the still image.

The first decoder 650 is connected to the encoder 630 and recovers the compressed image data that is compressed by the encoder 630 into compression recovered image data. The compression recovered image data includes simple compression recovered image data $D_{ir}$ and stored compression recovered image data $D_{mr}$. In an exemplary embodiment, the compression recovered image data recovered by the first decoder 650 is the simple compression recovered image data $D_{ir}$.

The second decoder 660 is connected to the frame memory 640 and recovers the compressed image data stored in the frame memory 640. The compressed image data recovered by the second decoder 660 is the stored compression recovered image data $D_{mr}$.

The mixer 680 mixes the input image data $D_{io}$, the simple compression recovered image data $D_{ir}$ and the stored compression recovered image data $D_{mr}$ and generate mixed image data $D_{ob}$. In an exemplary embodiment, the mixer 680 may use a method of mixing the input image data $D_{io}$ and the simple compression recovered image data $D_{ir}$ to generate the mixed image data $D_{ob}$, or a method of mixing the input image data $D_{io}$ and the stored compression recovered image data $D_{mr}$ to generate the mixed image data $D_{ob}$.

The signal controller 600 may further include a state controller 620 connected to the signal receiver 610. In such an embodiment, the state controller 620 may receive and transmits various signals.

In an exemplary embodiment, the state controller 620 receives the still image start signal from the signal receiver 610 to control the encoder 630, the first decoder 650, the second decoder 660 and the mixer 680, and transmits the signal for informing of the driving state of the display panel to the signal receiver 610.

In an exemplary embodiment, the signal controller 600 includes a first delay unit 670, connected to the signal receiver 610 and which delays the input image data $D_{io}$, and a second delay unit 672, connected to the first decoder 650 and which delays the simple compression recovered image data $D_{ir}$.

In an exemplary embodiment, the compression recovered image data $D_{ir}$ and $D_{mr}$ and the input image data $D_{io}$ are substantially simultaneously applied to the mixer 680 to mix the compression recovered image data $D_{ir}$ and $D_{mr}$ and the input image data $D_{io}$. In such an embodiment, the first delay unit 670 delays the input image data $D_{io}$ and the second delay unit 672 delays the simple compression recovered image data $D_{ir}$ such that the compression recovered image data $D_{ir}$ and $D_{mr}$ and the input image data $D_{io}$ are applied substantially simultaneously to the mixer 680.

Next, an exemplary embodiment of a driving method of the display device shown in FIGS. 1 and 2 according to the invention will be described.

Figure 3:
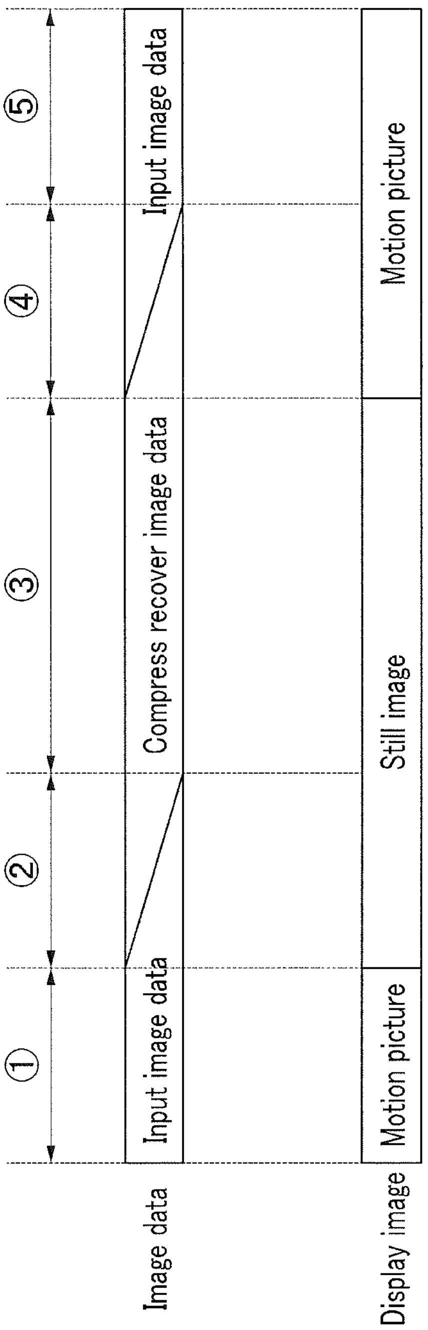
FIG. 3 is a timing diagram showing image data and a display image of an exemplary embodiment of a display device according to the invention.

FIG. 3 is a timing diagram of image data and a display image used in the display device shown in FIGS. 1 and 2 according to the invention.

Referring to FIG. 3, a driving period of a display device may be divided into a first motion picture display period ①, a first image conversion period ②, a still image display period ③, a second image conversion period ④ and a second motion picture display period ⑤.

In the first and second motion picture display periods ① and ⑤, the graphics processing unit 700 transmits the input image data $D_{io}$ to the display panel 300 to display the motion picture.

In the still image display period ③, the stored compression recovered image data $D_{mr}$ that is recovered from the compressed image data, which is transmitted from the graphics processing unit 700 and stored in the frame memory 640, to the display panel 300 to display the motion picture.

The first image conversion period ② is a period in which the first motion picture display period ① is converted into the still image display period ③.

In an exemplary embodiment where the image data is loss-compressed, the input image data $D_{io}$ and the stored compression recovered image data $D_{mr}$ have different values. In such an embodiment, the image data having substantially the same values may be differently displayed in the first motion picture display period ① and the still image display period ③. Accordingly, when the image data is directly converted to the still image display period ③ from the first motion picture display period ①, a difference of the image data due to a compression error may be recognized by a viewer. In such an embodiment, the first image conversion period ② is provided to mix the input image data $D_{io}$ and the compression recovered image data $D_{ir}$ and $D_{mr}$ such that the difference is not recognized by the viewer, and the mixed image data $D_{ob}$ is output to the display panel 300.

In an exemplary embodiment, the first image conversion period ② includes a plurality of frames. In such an embodiment, as the number of the frames is increased, the input image data $D_{io}$ may become more slowly changed into the compression recovered image data $D_{ir}$ and $D_{mr}$ such that the compression error may not recognized. The mixed image data $D_{ob}$ has a value that becomes closer to the input image data $D_{io}$ as a corresponding frame becomes closer to the first motion picture display period ①, and as the corresponding frame of the value of the mixed image data becomes closer to the still image display period ③, the mixed image data $D_{ob}$ has a value that becomes closer to the compression recovered image data $D_{ir}$ and $D_{mr}$. In such an embodiment, as the frame becomes closer to the first motion picture display period ①, the amount of the input image data $D_{io}$ becomes higher than the amount of the compression recovered image data $D_{ir}$ and $D_{mr}$, and as the frame becomes closer to the still image display period ③, the amount of compression recovered image data $D_{ir}$ and $D_{mr}$ becomes higher than the amount of the input image data $D_{io}$.

When the still image start signal is applied, the first image conversion period ② starts and the graphics processing unit 700 transmits the same input image data $D_{io}$ to the signal controller 600. Accordingly, although time has lapsed, the compressed image data stored in the frame memory 640 and the compressed image data, which is transmitted from the graphics processing unit 700 and then compressed, have substantially the same value. Accordingly, in the first image conversion period ②, the simple compression recovered image data $D_{ir}$ and the stored compression recovered image data $D_{mr}$ have substantially the same value. Therefore, in the first image conversion period ②, the mixed image data $D_{ob}$ generated by mixing the input image data $D_{io}$ and the simple compression recovered image data $D_{ir}$ has substantially the same value as the mixed image data $D_{ob}$ generated by mixing the input image data $D_{io}$ and the stored compression recovered image data $D_{mr}$.

The second image conversion period ④ is a period in which the still image display period ③ is converted to the second motion picture display period ⑤.

In the second image conversion period ④, the input image data $D_{io}$ and the simple compression recovered image data $D_{ir}$ are mixed, and the mixed image data $D_{ob}$ is output to the display panel 300.

In an exemplary embodiment, the second image conversion period ④ includes a plurality of frames. In such an embodiment, as the number of the frames increases, the simple compression recovered image data $D_{ir}$ becomes more slowly changed into the input image data $D_{io}$ such that the compression error may not be recognized by the viewer. The mixed image data $D_{ob}$ has a value that becomes closer to the simple compression recovered image data $D_{ir}$ as the corresponding frame of the value of the mixed image data becomes closer to the still image display period ③, and when the corresponding frame of the value of the mixed image data becomes closer to the second motion picture display period ⑤, it has a value that becomes closer to the input image data $D_{io}$. In such an embodiment, as the frame becomes closer to the still image display period ③, the amount of the simple compression recovered image data $D_{ir}$ becomes higher than the amount of the input image data $D_{io}$. In such an embodiment, as the corresponding frame of the value of the mixed image data becomes closer to the second motion picture display period ⑤, the amount of the simple compression recovered image data $D_{ir}$ becomes higher than the amount of the input image data $D_{io}$.

When the still image ending signal is started, the second image conversion period ④ is started and the graphics processing unit 700 transmits the input image data $D_{io}$ to the signal controller 600. In such an embodiment, the input image data $D_{io}$ to display the motion picture may be different every frame. Accordingly, the compression image data stored in the frame memory 640 and the compressed image data transmitted from the graphics processing unit 700 may have different values, and the simple compression recovered image data $D_{ir}$ and the stored compression recovered image data $D_{mr}$ may have different values in the second image conversion period ④. Here, the stored compression recovered image data $D_{mr}$ is data corresponding to the image of the corresponding frame of the value of the mixed image data such that the input image data $D_{io}$ and the simple compression recovered image data $D_{ir}$ are mixed to generate the mixed image data $D_{ob}$. In such an embodiment, the input image data $D_{io}$ and the stored compression recovered image data $D_{mr}$ are not mixed.

Next, an exemplary embodiment of a driving method of a display device according to the invention will be described step by step.

Figure 4:
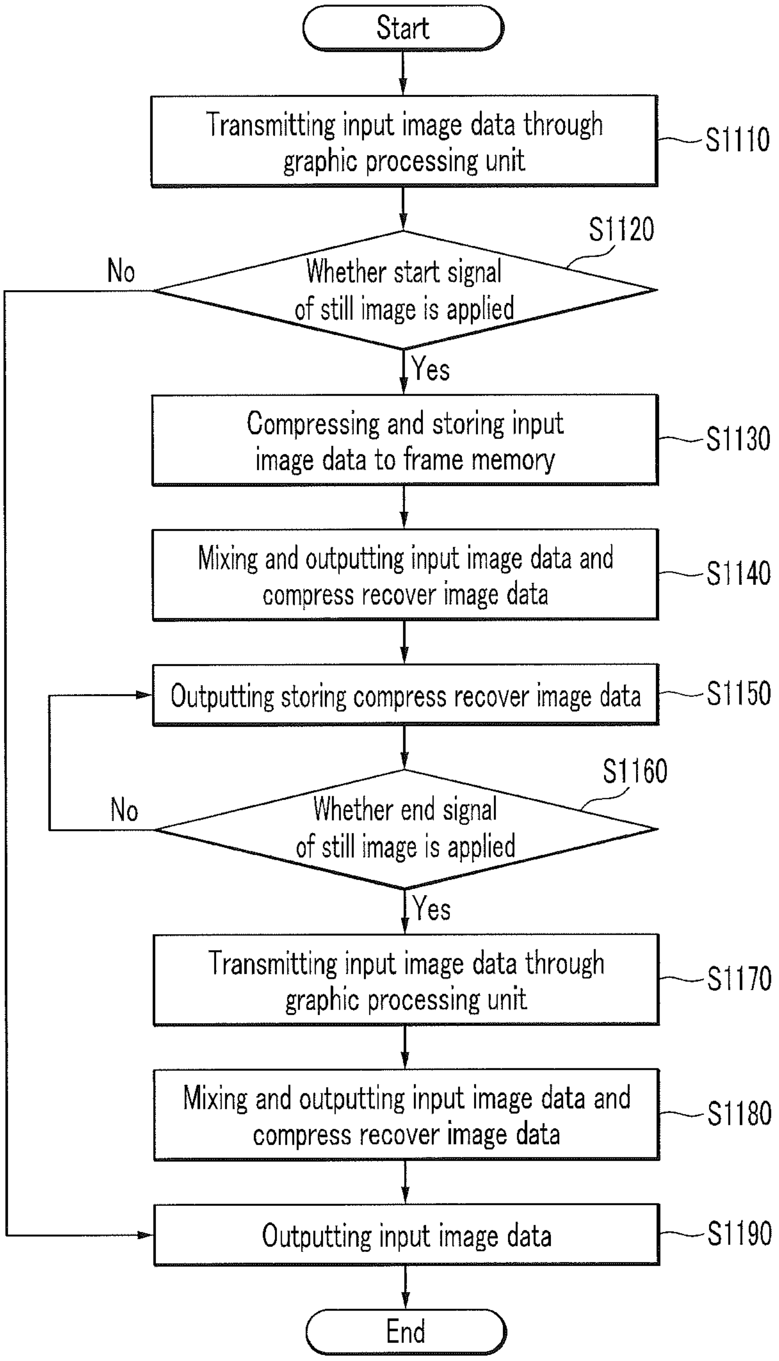
FIG. 4 is a flowchart showing an exemplary embodiment of a driving method of a display device according to the invention.
Figure 5:
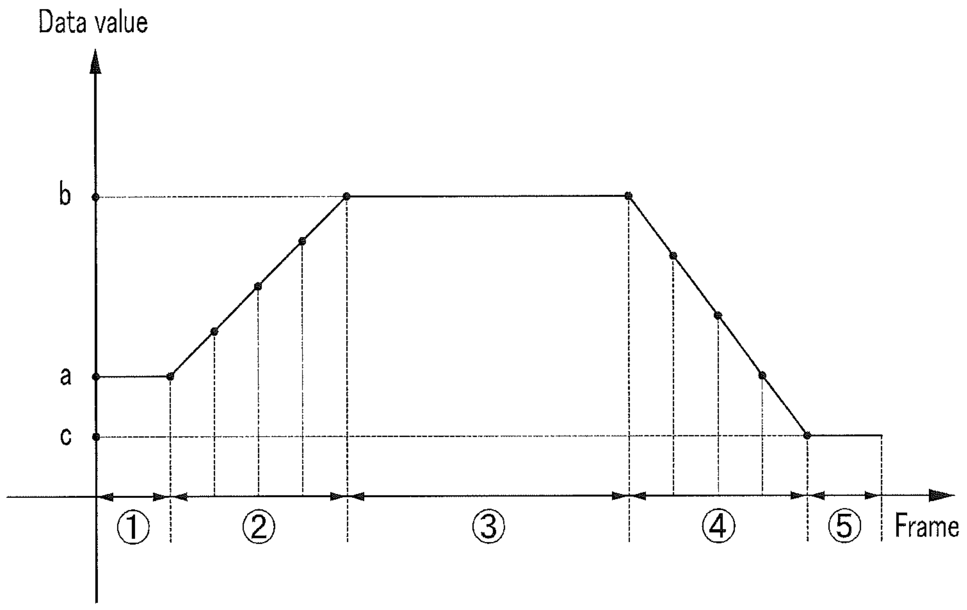
FIG. 5 is a graph showing data value versus time of image data transmitted to a display panel in the driving method of a display device of FIG. 4.
Figure 6:
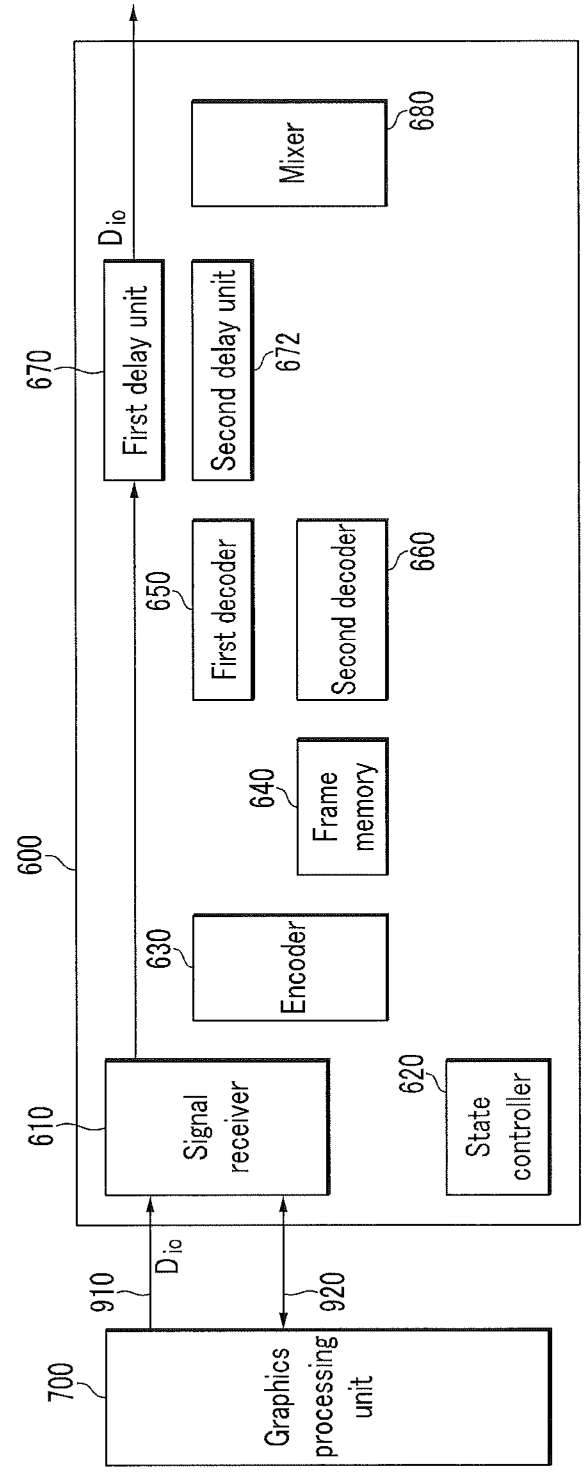
FIGS. 6 to 9 are block diagrams showing operations of an exemplary embodiment of a display device, when driven by the driving method of FIG. 4.
Figure 7:
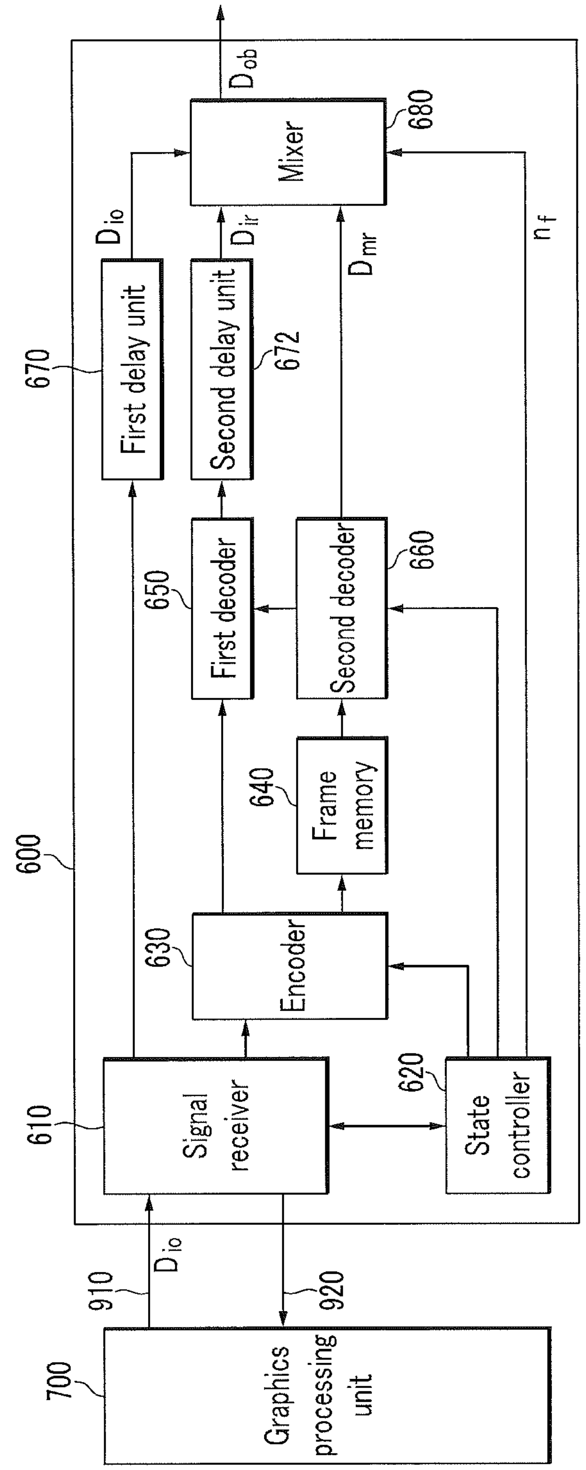
Figure 8:
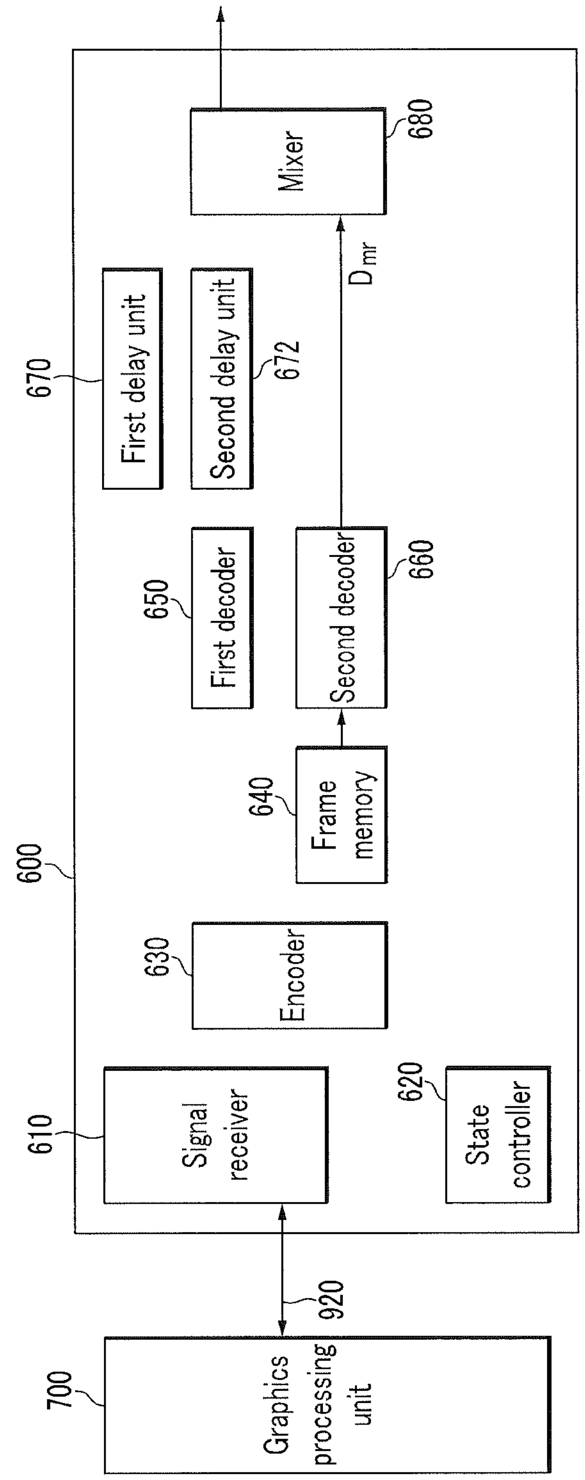
Figure 9:
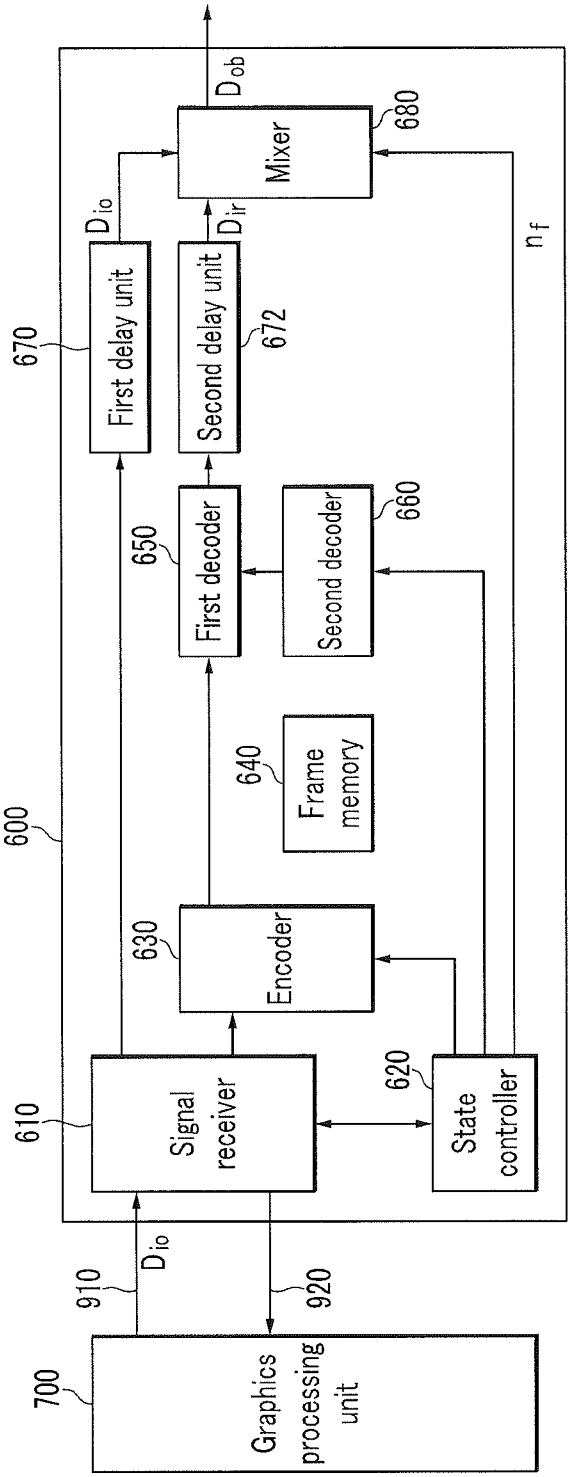

FIG. 4 is a flowchart showing an exemplary embodiment of a driving method of a display device according to the invention, and FIG. 5 is a graph showing data value versus time of image data transmitted to a display panel in an exemplary embodiment of a driving method of a display device according to the invention. FIGS. 6 to 9 are block diagrams showing an exemplary embodiment of a driving method of a display device according to the invention. FIG. 6 shows operations of the display device during the first and second motion picture display periods ① and ⑤, FIG. 7 shows operations of the display device during the first image conversion period ②, FIG. 8 shows operations of the display device during the still image display period ③, and FIG. 9 shows operations of the display device during the second image conversion period ④.

As shown in FIG. 6, the graphics processing unit 700 transmits the input image data $D_{io}$ to the signal receiver 610 of the signal controller 600 through the main link 910 (S1110).

It is determined whether the still image start signal is applied (S1120), and if the still image start signal is not applied, the input image data $D_{io}$ is output to the display panel 300 (S1190).

If the still image start signal is applied, as shown in FIG. 7, the encoder 630 compresses the input image data $D_{io}$, and the frame memory 640 stores the compressed image data (S1130). In such an embodiment, even if the still image start signal is applied, the graphics processing unit 700 continuously transmits the input image data $D_{io}$ to the signal controller 600 during a plurality of frames included in the first image conversion period ②. The first decoder 650 directly receives and recovers the compressed image data compressed by the encoder 630, and the second decoder 660 recovers the compressed image data stored in the frame memory 640.

The mixer 680 receives and mixes the input image data $D_{io}$ and the compression recovered image data $D_{ir}$ and $D_{mr}$ to generate the mixed image data $D_{ob}$, and outputs the mixed image data $D_{ob}$ to the display panel 300 (S1140). In such an embodiment, the input image data $D_{io}$ and the simple compression recovered image data $D_{ir}$ are respectively input to the mixer 680 through the first delay unit 670 and the second delay unit 672 to control to the timings thereof with respect to the stored compression recovered image data $D_{mr}$.

The mixer 680 may mix the input image data $D_{io}$ and the simple compression recovered image data $D_{ir}$ using Equation 1 below.

$$D_{ob} = \frac{D_{io} * (n_t - n_f) + D_{ir} * n_f}{n_t} \quad \text{[Equation 1]}$$

Herein, $D_{ob}$ denotes the value of the mixed image data, $D_{io}$ denotes a value of the input image data, $D_{ir}$ denotes a value of the simple compression recovered image data, $n_t$ denotes a number of the frames included in the first image conversion period, and $n_f$ denotes a frame number of the corresponding frame of the value of the mixed image data in the first image conversion period.

The first image conversion period ② includes a plurality of frames, and the input image data $D_{io}$ and the simple compression recovered image data $D_{ir}$ are mixed with different ratios in each frame.

For convenience of description, an exemplary embodiment, where the first image conversion period ② includes four frames, as shown in FIG. 5, will be described.

When the data value of the input image data $D_{io}$ is denoted as 'a' and the data value of the simple compression recovered image data $D_{ir}$ is denoted as the mixed image data $D_{ob}$ is (3a+b)/4 where the frame number of the corresponding frame of the value of the mixed image data is one in the first image conversion period, i.e., in the first frame of the first image conversion period ②. That is, the input image data $D_{io}$ and the simple compression recovered image data $D_{ir}$ are mixed with a ratio of 3:1 in the first frame.

In the second frame of the first image conversion period ②, the mixed image data $D_{ob}$ is (a+b)/2 such that the input image data $D_{io}$ and the simple compression recovered image data $D_{ir}$ are mixed with a ratio of 1:1.

In the third frame of the first image conversion period ②, the mixed image data $D_{ob}$ is (a+3b)/4 such that the input image data $D_{io}$ and the simple compression recovered image data $D_{ir}$ are mixed with a ratio of 1:3.

In the fourth frame of the first image conversion period ②, the mixed image data $D_{ob}$ is b such that the simple compression recovered image data $D_{ir}$ is output as it is.

As shown in the graph shown in FIG. 5, as the corresponding frame of the value of the mixed image data becomes substantially close to the first motion picture display period ①, the mixed image data $D_{ob}$ has a value substantially close to the input image data $D_{io}$, and as the corresponding frame of the value of the mixed image data becomes substantially close to the still image display period ③, the mixed image data $D_{ob}$ has a value substantially close to the simple compression recovered image data $D_{ir}$.

As described above, the mixer 680 mixes the input image data $D_{io}$ and the simple compression recovered image data $D_{ir}$ using Equation 1, while the mixer 680 may mix the input image data $D_{io}$ and the simple compression recovered image data $D_{io}$ using to Equation 2.

$$D_{ob} = \frac{D_{io} * (n_t - n_f) + D_{mr} * n_f}{n_t} \qquad \text{[Equation 2]}$$

Herein, $D_o$ denotes the value of the mixed image data, $D_{io}$ denotes the value of the input image data, $D_{mr}$ denotes the value of the stored compression recovered image data, $n_t$ denotes the number of the frames included in the first image conversion period ②, and $n_f$ denotes the frame number of the corresponding frame of the value of the mixed image data in the first image conversion period ②.

In the first image conversion period ②, the simple compression recovered image data $D_{ir}$ and the stored compression recovered image data $D_{mr}$ are substantially the same as each other in all frames such that the result is substantially the same as each other when Equation 1 or Equation 2 is applied.

Next, as shown in FIG. 8, when the signal receiver 610 transmits a signal for informing of the end of the first image conversion period ② to the graphics processing unit 700 through the assistant link 920 at the end of the first image conversion period ②, the graphics processing unit 700 stops transmitting the input image data $D_{io}$ to the signal receiver 610. In such an embodiment, the main link 910 is inactivated such that the transmission of the input image data $D_{io}$, is stopped.

In the still image display period ③, the encoder 630 and the first decoder 650 are not driven and the second decoder 660 recovers the compressed image data stored in the frame memory 640 to output the stored compression recovered image data $D_{mr}$ to the display panel (S1150).

In such an embodiment, it is determined whether the still image ending signal is applied (S1160), and if the still image ending signal is not applied, the stored compression recovered image data $D_{mr}$ is continuously output to the display panel.

When the still image ending signal is applied, as shown in FIG. 9, the main link 910 is re-activated and the graphics processing unit 700 transmits the input image data $D_{io}$ to the signal receiver 610 of the signal controller 600 through the main link 910 (S1170). In such an embodiment, the encoder 630 compresses the input image data $D_{io}$, and the first decoder 650 receives and recovers the image data compressed by the encoder 630.

In such an embodiment, the mixer 680 receives and mixes the input image data $D_{io}$ and the simple compression recovered image data $D_{ir}$ to generate and output the mixed image data $D_{ob}$ to the display panel 300 (S1180). In such an embodiment, the input image data $D_{io}$ and the simple compression recovered image data $D_{ir}$ are input to the mixer 680 through the first delay unit 670 and the second delay unit 672 such that timings of the input image data $D_{io}$ and the simple compression recovered image data $D_{ir}$ are controlled to be substantially identical to each other, e.g., controlled such that the input image data $D_{io}$ and the simple compression recovered image data $D_{ir}$ are synchronized with each other.

The mixer 680 may mix the input image data $D_{io}$ and the simple compression recovered image data $D_{ir}$ using Equation 3 below.

$$D_{ob} = \frac{D_{io} * n_f + D_{ir} * (n_t - n_f)}{n_t} \qquad \text{[Equation 3]}$$

Herein, $D_{ob}$ denotes the value of the mixed image data, $D_{io}$ denotes the value of the input image data, $D_{ir}$ denotes the value of the simple compression recovered image data, $n_t$ denotes the value of the number of the frames included in the second image conversion period ④, and $n_f$ denotes the frame number of the corresponding frame of the value of the mixed image data in the second image conversion period ④.

In an exemplary embodiment, the second image conversion period ④ includes a plurality of frames, and the input image data $D_{io}$ and the simple compression recovered image data $D_{ir}$ are mixed with different ratios in each frame.

Referring to FIG. 5, an exemplary embodiment, where the second image conversion period ④ includes four frames, will be described.

When the data value of the input image data $D_{io}$ is 'c' and the data value of the simple compression recovered image data $D_{ir}$ is 'b', the mixed image data $D_{ob}$ is (c+3b)/4 when the number of the corresponding frame of the value of the mixed image data s one, i.e., in the first frame of the second image conversion period ④. That is, the input image data $D_{io}$ and the simple compression recovered image data $D_{ir}$ are mixed with a ratio of 1:3 in the first frame.

In the second frame of the second image conversion period ④, the mixed image data $D_{ob}$ is (a+b)/2 such that the input image data $D_{io}$ and the simple compression recovered image data $D_{ir}$ are mixed with a ratio of 1:1.

In the third frame of the second image conversion period ④, the mixed image data $D_{ob}$ is (3c+b)/4 such that the input image data $D_{io}$ and the simple compression recovered image data $D_{ir}$ are mixed with a ratio of 3:1.

In the fourth frame of the second image conversion period ④, the mixed image data $D_{ob}$ is c such that the input image data $D_{io}$ is output as it is.

As shown in the graph shown in FIG. 5, as the corresponding frame of the value of the mixed image data becomes closer to the first motion picture display period ①, the mixed image data $D_{ob}$ has a value that becomes closer to the input image data $D_{io}$, and as the corresponding frame of the value of the mixed image data becomes closer to the still image display period ③, the mixed image data $D_{ob}$ has a value that becomes closer to the simple compression recovered image data $D_{ir}$.

When the second image conversion period ④ is ended, the encoder 630, the frame memory 640, the first decoder 650 and the second decoder 660 are inactivated, and the input image data $D_{io}$ is output to the display panel 300 (S1190).

As described above, in an exemplary embodiment of the driving method of the display device according to the invention, the data value of the mixed image data $D_{ob}$ is linearly changed using Equation 1 to Equation 3 based on the frame number of the corresponding frame of the value of the mixed image data in the first image conversion period ② and the second image conversion period ④. However, the invention is not limited thereto. In an alternative exemplary embodiment, the data value of the mixed image data $D_{ob}$ may be non-linearly changed according to the passage of the frame.

Next, alternative exemplary embodiments of a display device according to the invention will be described with reference to FIGS. 10 to 13.

In an alternative exemplary embodiment, the simple compression recovered image data $D_{ir}$ and the stored compression recovered image data $D_{mr}$ are compared in the second image conversion period ④ such that the output is changed, and this will hereinafter be described in detail.

Figure 10:
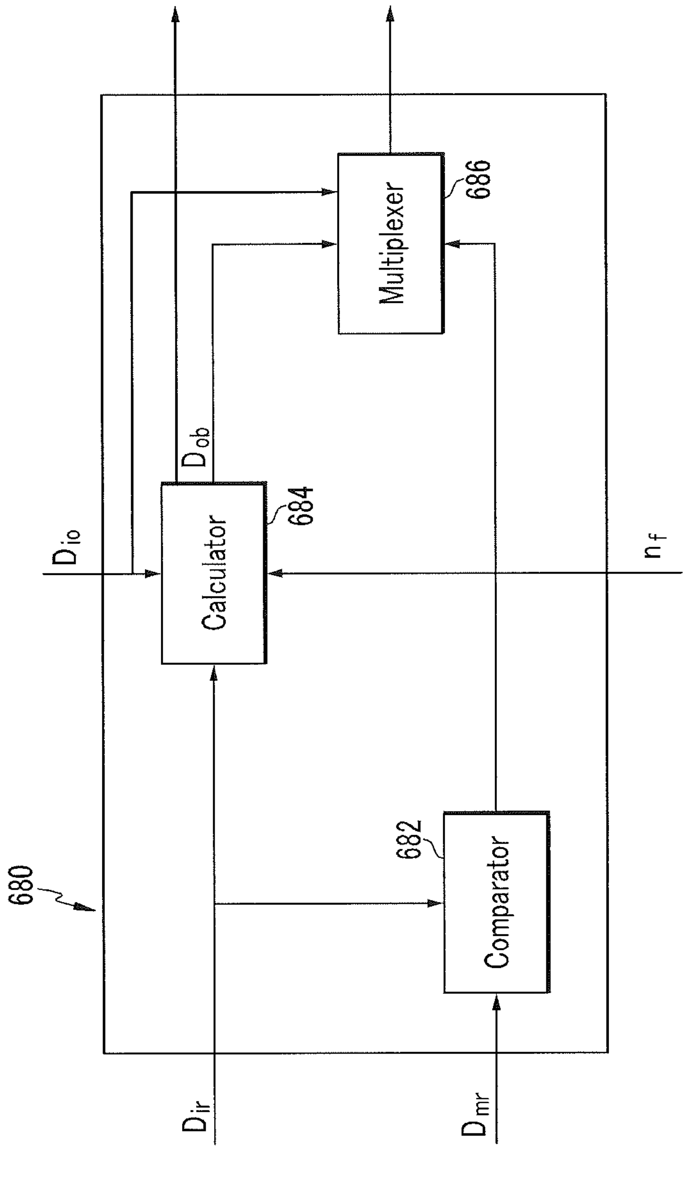
FIG. 10 is a block diagram showing an exemplary embodiment of a mixer of a display device according to the invention.

FIG. 10 is a block diagram showing a mixer of an alternative exemplary embodiment of a display device according to the invention. The display device including the mixer shown in FIG. 10 is substantially the same as the exemplary embodiment shown in FIGS. 1 to 3 except for the mixer such that the exemplary embodiment of the display device in FIG. 10 will be described referring again to FIGS. 1 to 3.

Since the display device in FIG. 10 is substantially the same as the display device shown in FIGS. 1 to 3, any repetitive detailed description thereof will hereinafter be omitted or simplified.

In an exemplary embodiment, the display device includes the display panel 300, the gate driver 400, the data driver 500, the signal controller 600, the graphics processing unit 700 and the gray voltage generator 800. In such an embodiment, the signal controller 600 includes the signal receiver 610, the encoder 630, the frame memory 640, the first decoder 650, the second decoder 660 and the mixer 680 similarly to the display device shown in FIG. 2.

In an exemplary embodiment, as shown in FIG. 10, the mixer 680 includes a comparator 682 that compares the simple compression recovered image data $D_{ir}$ and the stored compression recovered image data $D_{mr}$ in the second image conversion period ④, in which the still image is converted into the motion picture, a calculator 684 that mixes the input image data $D_{io}$ and the simple compression recovered image data $D_{ir}$ to generate the mixed image data $D_{ob}$, and a multiplexer 686 that receives a comparison result from the comparator 682 to output the mixed image data $D_{ob}$ or the input image data $D_{io}$ to the display panel 300.

The comparator 682 determines whether the simple compression recovered image data $D_{ir}$ and the stored compression recovered image data $D_{mr}$ are substantially the same in the second image conversion period ④, and transmits the comparison result acquired by determining whether the simple compression recovered image data $D_{ir}$ and the stored compression recovered image data $D_{mr}$ are substantially the same to the multiplexer 686.

In an exemplary embodiment, the calculator 684 receives and mixes the input image data $D_{io}$ and the simple compression recovered image data $D_{ir}$ in the first image conversion period ② and the second image conversion period ④ to generate the mixed image data $D_{ob}$. The calculator 684 transmits the mixed image data $D_{ob}$ to the display panel 300 in the first image conversion period ② and transmits the mixed image data $D_{ob}$ to the multiplexer 686 in the second image conversion period ④.

In an alternative exemplary embodiment, the calculator 684 may mix the input image data $D_{io}$ and the stored compression recovered image data $D_{mr}$ to generate the mixed image data $D_{ob}$ in the first image conversion period ② similarly to the exemplary embodiments shown in FIGS. 4 to 9.

The multiplexer 686 receives the comparison result from the comparator 682 in the second image conversion period ④ and outputs the mixed image data $D_{ob}$ to the display panel 300 when the simple compression recovered image data $D_{ir}$ and the stored compression recovered image data $D_{mr}$ are substantially the same. To display the motion picture, in spite of the transmission of the input image data $D_{io}$ of the graphics processing unit 700 to the signal controller 600, when the simple compression recovered image data $D_{ir}$ and the stored compression recovered image data $D_{mr}$ are substantially the same, the characteristics of the still image are substantially recognized. Accordingly, the mixed image data $D_{ob}$, of which the input image data $D_{io}$ and the simple compression recovered image data $D_{ir}$ are mixed, is output like in the first image conversion period ④.

In such an embodiment, the multiplexer 686 outputs the input image data $D_{io}$ to the display panel 300 when the simple compression recovered image data $D_{ir}$ and the stored compression recovered image data $D_{mr}$ are different from each other. If the simple compression recovered image data $D_{ir}$ and the stored compression recovered image data $D_{mr}$ are different from each other, the characteristics of the motion picture are substantially recognized. Accordingly, although the data value of the image data DAT applied to the display panel 300 is changed, no compression error occurs such that the input image data $D_{io}$ may be output to the display panel 300 as it is.

The mixer 680 is not driven in the first motion picture display period ① and the still image display period ③, and is driven in the first image conversion period ② and the second image conversion period ④. In the mixer 680, the calculator 684 is driven in the first image conversion period and the second image conversion period ④, while the comparator 682 and the multiplexer 686 are only driven in the second image conversion period ④.

Next, an alternative exemplary embodiment of a driving method of a display device according to the invention will be described in greater detail.

Figure 11:
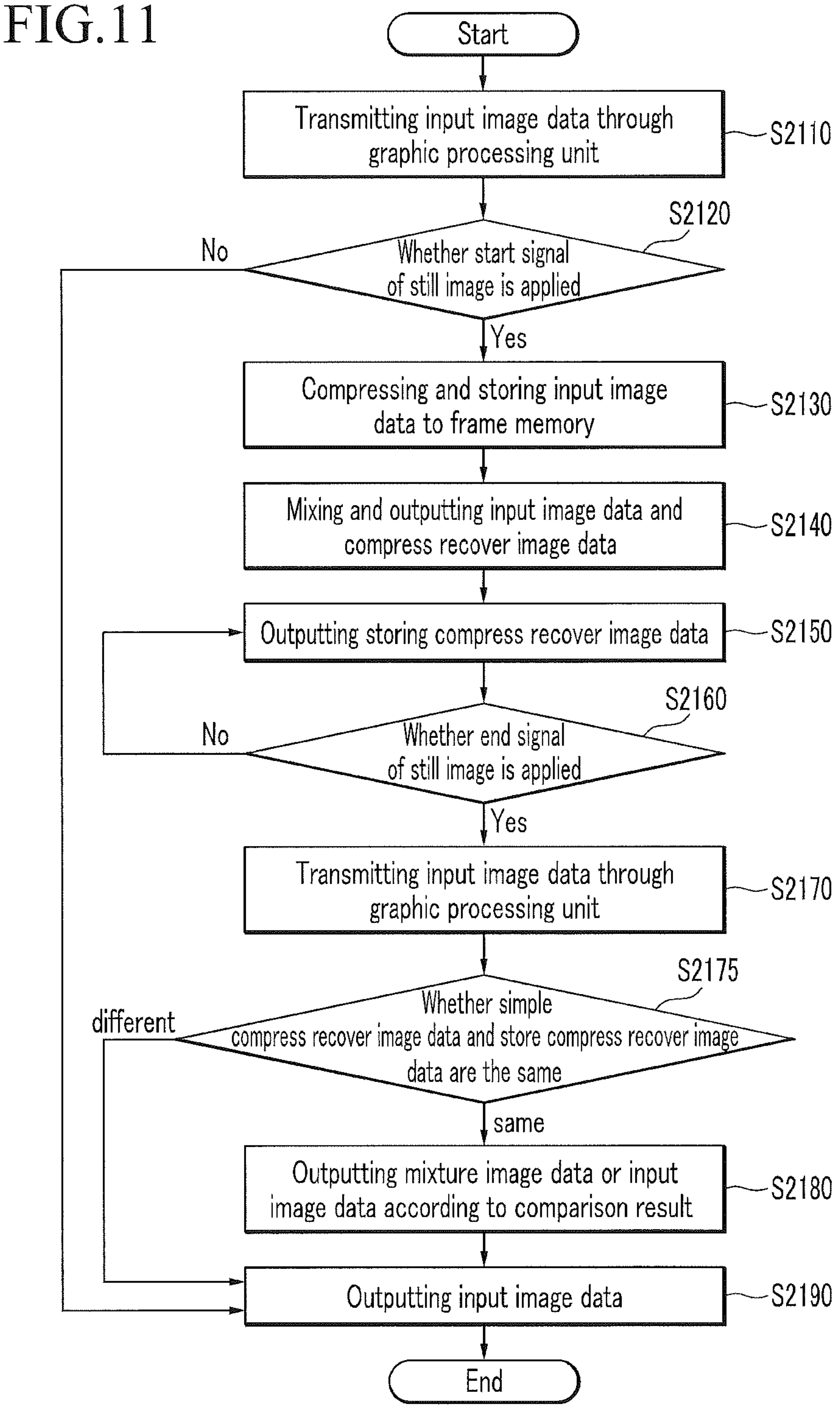
FIG. 11 is a flowchart showing an alternative exemplary embodiment of a driving method of a display device according to the invention.
Figure 12:
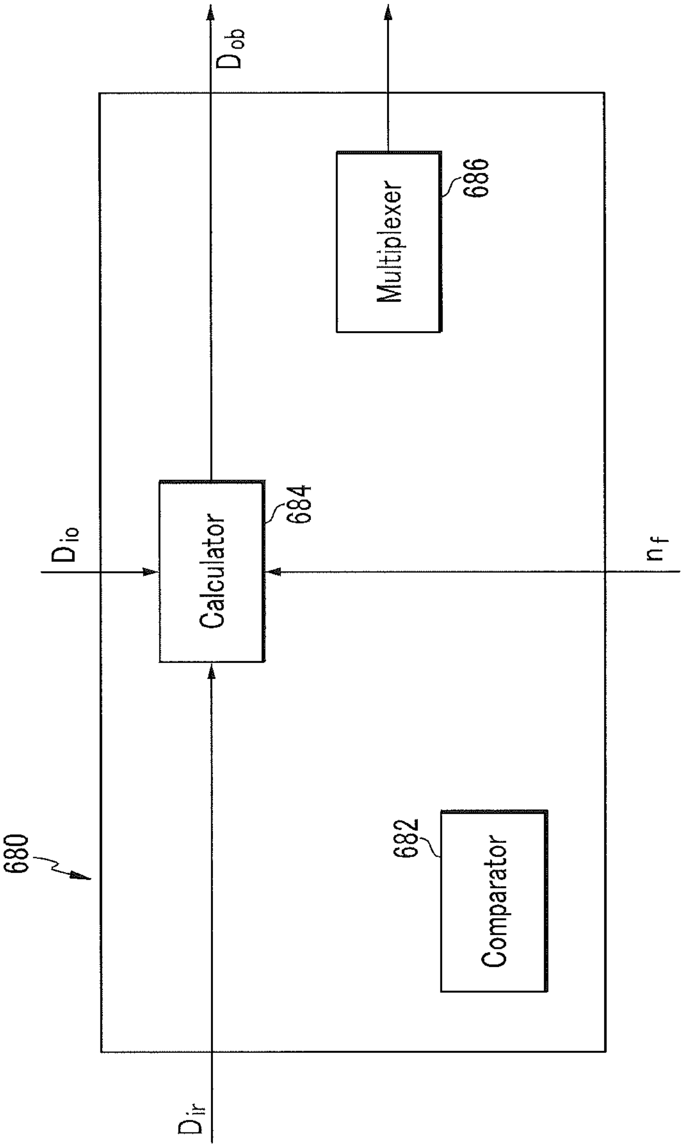
FIGS. 12 to 13 are block diagrams showing operations of the mixer in the driving method of a display device shown in FIG. 11.
Figure 13:
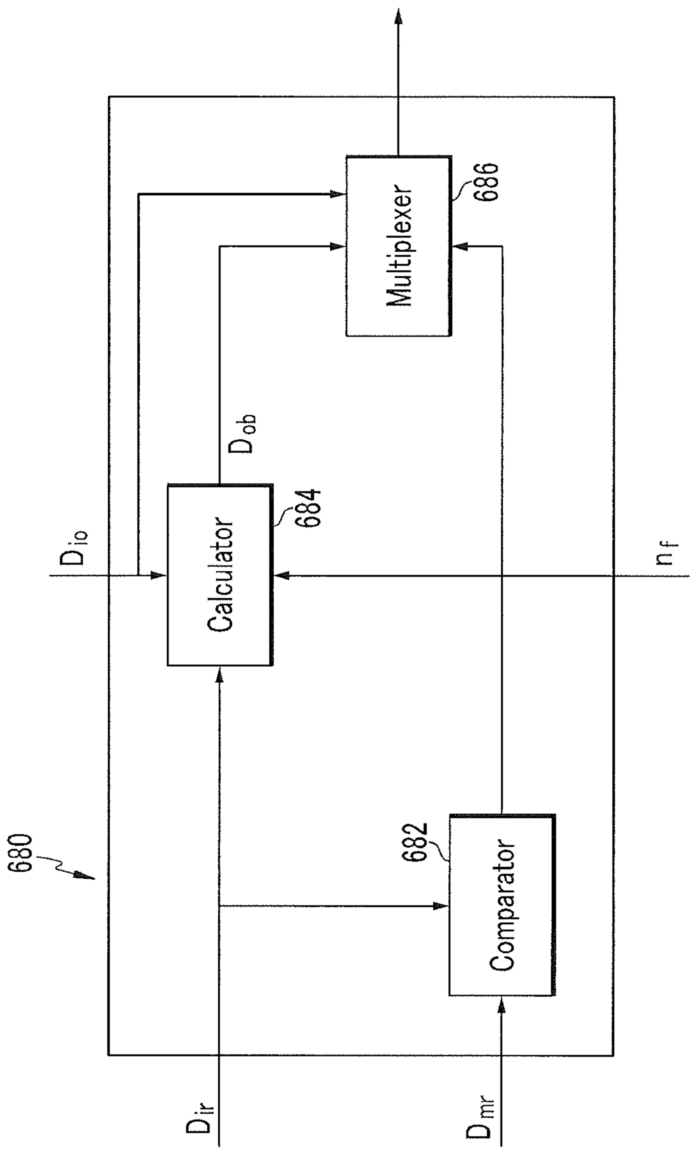

FIG. 11 is a flowchart showing an exemplary embodiment of a driving method of a display device shown in FIG. 10 according to the invention, and FIGS. 12 and 13 are block diagrams showing operations of the mixer in the driving method of a display device shown in FIG. 11. FIG. 12 shows operation of the mixer in the first image conversion period ②, and FIG. 13 shows operation of the mixer in the second image conversion period ④. The driving method of the display device is substantially the same as the exemplary embodiment shown in FIGS. 4 to 9 except for the driving method of the mixer, and the exemplary embodiment of a driving method of a display device shown in FIGS. 11 to 13 will be described referring again to FIGS. 6 to 9.

As described above, the driving method of the display device shown in FIGS. 11 to 13 is substantially the same as the driving method of the display device shown in FIGS. 4 to 9, and any repetitive detailed description thereof will hereinafter be omitted or simplified.

Firstly, referring again to FIG. 6, the graphics processing unit 700 transmits the input image data $D_{io}$ to the signal receiver 610 (S2110).

It is determined whether the still image start signal is applied (S2120). In such an embodiment, when the still image start signal is not applied, the input image data $D_{io}$ is output to the display panel 300 (S2190).

If the still image start signal is applied, as shown in FIG. 7, the encoder 630 compresses the input image data $D_{io}$, and the frame memory 640 stores the compressed image data (S2130).

Referring now to FIG. 12, the calculator 684 of the mixer 680 receives and mixes the input image data $D_{io}$ and the simple compression recovered image data $D_{ir}$ using Equation 1 described above to generate the mixed image data $D_{ob}$ and outputs it to the display panel 300. In such an embodiment, the driving of the mixer 680 is executed in the first image conversion period ②. In one exemplary embodiment, for example, only the calculator 684 of the mixer 680 is driven, and the comparator 682 and the multiplexer 686 are not driven (S2140).

In such an embodiment, the input image data $D_{io}$ and the stored compression recovered image data $D_{mr}$ may be mixed using Equation 2 described above.

As shown in FIG. 8, when the first image conversion period ② is ended, the graphics processing unit 700 stops the transmission of the input image data $D_{10}$.

In such an embodiment, the second decoder 660 recovers the compressed image data stored in the frame memory 640 to output the stored compression recovered image data $D_{mr}$ to the display panel (S2150).

It is determined whether the still image ending signal is applied (S2160), and if the still image ending signal is not applied, the stored compression recovered image data $D_{mr}$ is continuously output to the display panel.

If the still image ending signal is increased, as shown in FIG. 9, the graphics processing unit 700 transmits the input image data $D_{io}$ to the signal receiver 610 (S2170). In such an embodiment, the encoder 630 compresses the input image data $D_{io}$, and the first decoder 650 directly receives and recovers the image data compressed by the encoder 630.

As shown in FIG. 13, in the second image conversion period ④, the mixer 680 receives the input image data $D_{io}$, the simple compression recovered image data $D_{ir}$ and the stored compression recovered image data $D_{mr}$, and the comparator 682 of the mixer 680 compares the simple compression recovered image data $D_{ir}$ and the stored compression recovered image data $D_{mr}$. In such an embodiment, the comparator 682 of the mixer 680 determines whether the simple compression recovered image data $D_{ir}$ and the stored compression recovered image data $D_{mr}$ are substantially the same, and transmits the result thereof to the multiplexer 686 (S2175).

In an exemplary embodiment, the calculator 684 of the mixer 680 receives the input image data $D_{io}$ and the simple compression recovered image data $D_{ir}$ and mixes them according to Equation 3 described above to generate and transmit the mixed image data $D_{ob}$ to the multiplexer 686.

The multiplexer 686 of the mixer 680 receives the input image data $D_{io}$ and the mixed image data $D_{ob}$ and receives the comparison result from the comparator 682 to output the mixed image data $D_{ob}$ or the input image data $D_{io}$ to the display panel 300. In such an embodiment, when the simple compression recovered image data $D_{ir}$ and the stored compression recovered image data $D_{mr}$ are substantially the same, the multiplexer 686 outputs the mixed image data $D_{ob}$ to the display panel 300 (S2180). In such an embodiment, when the simple compression recovered image data $D_{ir}$ and the stored compression recovered image data $D_{mr}$ are different, the multiplexer 686 outputs the input image data $D_{io}$ to the display panel 300.

When the second image conversion period ④ is ended, the input image data $D_{io}$ is output to the display panel 300 (S2190).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:

a display panel which displays a still image and a motion picture;

a signal controller which controls signals to drive the display panel; and a graphics processing unit which transmits input image data to the signal controller, wherein the signal controller comprises:

a frame memory which stores compressed image data generated by compressing the input image data from the graphic processing unit; and a mixer which mixes compression recovered image data generated by recovering the compressed image data and the input image data of a frame from the graphic processing unit and generates mixed image data to be output to the display panel during the frame, wherein the signal controller outputs the input image data to the display panel in a motion picture display period during which the motion picture is displayed, the signal controller outputs stored compression recovered image data to the display panel in a still image display period during which the still image is displayed, and the signal controller outputs the mixed image data to the display panel in a first image conversion period during which the motion picture is converted into the still image, and a second image conversion period during which the still image is converted into the motion picture.

2. The display device of claim 1, wherein the compression recovered image data includes:

simple compression recovered image data generated by recovering the compressed image data before the compress image data is stored in the frame memory; and the stored compression recovered image data generated by recovering the compressed image data stored in the frame memory.

3. The display device of claim 1, wherein the mixed image data has a value between the input image data and the compression recovered image data.

4. The display device of claim 3, wherein the first image conversion period includes a plurality of frames, and the mixed image data has a value which becomes closer to the input image data as a corresponding frame of the value of the mixed image data becomes closer to the motion picture display period and which becomes closer to the compression recovered image data as the corresponding frame of the value of the mixed image data becomes closer to the still image display period to mix the input image data and the compression recovered image data such that a difference of the image data due to a compression error is not recognized by a viewer.

5. The display device of claim 4, wherein the mixer mixes the simple compression recovered image data and the input image data in the first image conversion period.

6. The display device of claim 5, wherein the mixer generates the mixed image data using the following equation:

$$D_{ob} = \frac{D_{io} * (n_t - n_f) + D_{ir} * n_f}{n_t},$$

wherein $D_{ob}$ denotes the value of the mixed image data, $D_{io}$ denotes a value of the input image data, $D_{ir}$ denotes a value of the simple compression recovered image data, $n_t$ denotes a number of the frames included in the first image conversion period, and $n_f$ denotes a frame number of the corresponding frame of the value of the mixed image data in the first image conversion period.

7. The display device of claim 4, wherein the mixer mixes the stored compression recovered image data and the input image data in the first image conversion period.

8. The display device of claim 7, wherein the mixer generates the mixed image data using the following equation:

$$D_{ob} = \frac{D_{io} * (n_t - n_f) + D_{mr} * n_f}{n_t},$$

wherein $D_o$ denotes the value of the mixed image data, $D_{io}$ denotes a value of the input image data, $D_{mr}$ denotes a value of the stored compression recovered image data, $n_t$ denotes a number of the frames included in the first image conversion period, and $n_f$ denotes a frame number of the corresponding frame of the value of the mixed image data in the first image conversion period.

9. The display device of claim 4, wherein the mixer comprises:
a comparator which compares the simple compression recovered image data and the stored compression recovered image data in a second image conversion period in which the still image is converted into the motion picture;
a calculator which generates the mixed image data; and
a multiplexer which outputs the mixed image data to the display panel when the simple compression recovered image data and the stored compression recovered image data are substantially the same as each other, and outputs the input image data to the display panel when the simple compression recovered image data and the stored compression recovered image data are different from each other.

10. The display device of claim 9, wherein the calculator generates the mixed image data using the following equation:

$$D_{ob} = \frac{D_{io} * n_f + D_{ir} * (n_t - n_f)}{n_t},$$

wherein $D_{ob}$ denotes the value of the mixed image data, $D_{io}$ denotes a value of the input image data, $D_{ir}$ denotes a value of the simple compression recovered image data, $n_t$ denotes a number of the frames included in the second image conversion period, and $n_f$ denotes a frame number of the corresponding frame of the value of the mixed image data in the second image conversion period.

11. The display device of claim 4, wherein the signal controller comprises
a signal receiver which receives the input image data from the graphics processing unit;
an encoder which receives the input image data from the signal receiver and compresses the input image data such that the compressed image data is generated;
a first decoder which receives the compressed image data from the encoder and recovers the compressed image data; and
a second decoder which recovers the compressed image data stored in the frame memory.

12. The display device of claim 11, wherein
the signal controller delays and transmits the simple compression recovered image data to the mixer, and
the signal controller delays and transmits the stored compression recovered image data to the mixer.

13. A method of driving a display device, the method comprising:
transmitting input image data from a graphics processing unit of the display device to a signal controller of the display device;
receiving a still image start signal and compressing the input image data from the graphics processing unit into compressed image data;
storing the compressed image data in a frame memory of the display device; and
generating mixed image data by mixing compression recovered image data and the input image data of a frame from the graphics processing unit, and outputting the mixed image data to a display panel of the display device during the frame,
wherein the compression recovered image data is generated by recovering the compressed image data in a first image conversion period, in which a motion picture is converted into a still image,
wherein the input image data is output from the signal controller to the display panel in a motion picture display period, during which the motion picture is displayed,
the stored compression recovered image data is output from the signal controller to the display panel in a still image display period, during which the still image is displayed,
the mixed image data is output from the signal controller to the display panel in a first image conversion period, during which the motion picture is converted into the still image, and in a second image conversion period, during which the still image is converted into the motion picture.

14. The method of claim 13, wherein the mixed image data has a value between the input image data and the compression recovered image data.

15. The method of claim 14, wherein the first image conversion period includes a plurality of frames, and the mixed image data has a value which becomes closer to the input image data as a corresponding frame of the value becomes closer to a motion picture display period, in which the motion picture is displayed, and becomes closer to the compression recovered image data as the corresponding frame of the value of the mixed image data becomes closer to a still image display period, in which the still image is displayed, to mix the input image data and the compression recovered image data such that a difference of the image data due to a compression error is not recognized by a viewer.

16. The method of claim 15, wherein the compression recovered image data includes:

simple compression recovered image data generated by recovering the compressed image data before the compress image data is stored in the frame memory; and the stored compression recovered image data generated by recovering the compressed image data stored in the frame memory.

17. The method of claim 16, wherein the generating the mixed image data by mixing the compression recovered image data and the input image data comprises mixing the simple compression recovered image data and the input image data.

18. The method of claim 17, wherein the generating the mixed image data by mixing the compression recovered image data and the input image data further comprises using the following equation:

$$D_{ob} = \frac{D_{io} * (n_t - n_f) + D_{ir} * n_f}{n_t},$$

wherein $D_{ob}$ denotes the value of the mixed image data, $D_{io}$ denotes a value of the input image data, $D_{ir}$ denotes a value of the simple compression recovered image data, $n_t$ denotes a number of the frames included in the first image conversion period, and $n_f$ denotes a frame number of the corresponding frame of the value of the mixed image data in the first image conversion period.

19. The method of claim 16, wherein the generating the mixed image data by mixing the compression recovered image data and the input image data comprises mixing the stored compression recovered image data and the input image data.

20. The method of claim 19, wherein the generating the mixed image data by mixing the compression recovered image data and the input image data further comprises using the following equation:

$$D_{ob} = \frac{D_{io} * (n_t - n_f) + D_{mr} * n_f}{n_t},$$

wherein $D_o$ denotes the value of the mixed image data, $D_{io}$ denotes a value of the input image data, $D_{mr}$ denotes a value of the stored compression recovered image data, $n_t$ denotes a number of the frames included in the first image conversion period, and $n_f$ denotes a frame number of the corresponding frame of the value of the mixed image data in the first image conversion period.

21. The method of claim 16, further comprising outputting the stored compression recovered image data to the display panel in the still image display period, wherein the graphics processing unit stops transmission of the input image data in the still image display period.

22. The method of claim 21, further comprising receiving a still image ending signal, wherein the graphics processing unit transmits the input image data to the signal controller when receiving the still image ending signal.

23. The method of claim 22, further comprising mixing the compression recovered image data and the input image data in the second image conversion period in which the still image is converted into the motion picture, and outputting the mixed image data to the display panel.

24. The method of claim 23, further comprising outputting the input image data to the display panel in the motion picture display period.

25. The method of claim 22, further comprising:

comparing the simple compression recovered image data and the stored compression recovered image data in a second image conversion period in which the still image is converted into the motion picture;

mixing the compression recovered image data and the input image data; and outputting the mixed image data to the display panel when the simple compression recovered image data and the stored compression recovered image data are substantially the same as each other, and outputting the input image data to the display panel when the simple compression recovered image data and the stored compression recovered image data are different from each other.

26. The method of claim 25, wherein the mixing the compression recovered image data and the input image data comprises using the following equation:

$$D_{ob} = \frac{D_{io} * n_f + D_{ir} * (n_t - n_f)}{n_t},$$

wherein $D_{ob}$ denotes the value of the mixed image data, $D_{io}$ denotes a value of the input image data, $D_{ir}$ denotes a value of the simple compression recovered image data, $n_t$ denotes a number of the frames included in the second image conversion period, and $n_f$ denotes a frame number of the corresponding frame of the value of the mixed image data in the second image conversion period.

27. The method of claim 13, wherein the generating mixed image data by mixing compression recovered image data and the input image data comprises delaying the compression recovered image data such that the compression recovered image data is synchronized with the input image data.

* * * * *